(12) United States Patent
Crookham et al.

(10) Patent No.: US 8,605,394 B2
(45) Date of Patent: Dec. 10, 2013

(54) APPARATUS, METHOD, AND SYSTEM FOR MONITORING LEAKAGE CURRENT AND DETECTING FAULT CONDITIONS IN ELECTRICAL SYSTEMS

(75) Inventors: Joe P. Crookham, Oskaloosa, IA (US); Myron Gordin, Oskaloosa, IA (US); Darrell N. Chelcun, West Dundee, IL (US)

(73) Assignee: Musco Corporation, Oskaloosa, IA (US)

(*) Notice: Subject to any disclaimer, the term of this patent is extended or adjusted under 35 U.S.C. 154(b) by 552 days.

(21) Appl. No.: 12/833,544

(22) Filed: Jul. 9, 2010

(65) Prior Publication Data

US 2011/0007443 A1 Jan. 13, 2011

Related U.S. Application Data

(60) Provisional application No. 61/224,370, filed on Jul. 9, 2009.

(51) Int. Cl.
*H02H 3/00* (2006.01)
*H02H 9/08* (2006.01)

(52) U.S. Cl.
USPC .............. 361/42; 361/45; 361/49; 361/50

(58) Field of Classification Search
USPC .................. 361/42, 45, 49, 50
See application file for complete search history.

(56) References Cited

U.S. PATENT DOCUMENTS

| | | | |
|---|---|---|---|
| 4,253,418 A * | 3/1981 | Lockwood et al. | 119/236 |
| 4,994,718 A | 2/1991 | Gordin | |
| 5,638,057 A * | 6/1997 | Williams | 340/947 |
| 5,715,125 A * | 2/1998 | Neiger et al. | 361/42 |
| 6,054,865 A | 4/2000 | Bald et al. | |
| 6,097,580 A | 8/2000 | Zaretsky | |
| 6,327,124 B1 * | 12/2001 | Fearing et al. | 361/31 |
| 6,421,618 B1 | 7/2002 | Kliman et al. | |
| 6,631,063 B2 | 10/2003 | Ortiz et al. | |
| 6,681,110 B1 | 1/2004 | Crookham et al. | |

(Continued)

OTHER PUBLICATIONS

Trafox—World class quality with Finnish mentality "VR-14 Single Channel Monitoring Unit", retrieved from the Internet: http://www.trafox.fi/index.php?id=203 on Jun. 14, 2010 (12 pages).

(Continued)

*Primary Examiner* — Jared Fureman
*Assistant Examiner* — Zeev V Kitov
(74) *Attorney, Agent, or Firm* — McKee, Voorhees & Sease, P.L.C.

(57) ABSTRACT

Disclosed herein are apparatus, methods, and systems for monitoring and detection of conditions indicative of an electrical fault for an electrical circuit or system. In one aspect, a central control can simultaneously monitor a plurality of geographically distributed electrical circuits or systems for conditions that have been predetermined to be indicative of an electrical fault or concern, and provide either some communication (e.g., a warning) or instruction (e.g., to terminate power) back to the monitored circuit/system, the owner/operator/user of the circuit/system, or both. The central control can collect, store, mine, and analyze data from the diverse monitoring of plural systems. A knowledge base can be built up over time and used to establish monitoring of the same, other circuits and systems, develop more accurate monitoring and communication of faults or concerns, and account for factors related to normal operation of a circuit or system.

17 Claims, 11 Drawing Sheets

(56) References Cited

U.S. PATENT DOCUMENTS

| | | | |
|---|---|---|---|
| 6,700,062 B1 * | 3/2004 | Allen, Jr. ........................ | 174/53 |
| 6,708,126 B2 | 3/2004 | Culler et al. | |
| 7,046,882 B2 | 5/2006 | Kline | |
| 7,161,354 B2 | 1/2007 | Takakamo et al. | |
| 7,163,354 B2 | 1/2007 | Runestad | |
| 7,248,057 B1 | 7/2007 | Kumar | |
| 7,345,489 B2 * | 3/2008 | DeHaven ...................... | 324/555 |
| 7,353,123 B2 | 4/2008 | Takakamo et al. | |
| 7,400,150 B2 | 7/2008 | Cannon | |
| 7,501,830 B2 | 3/2009 | Kumar | |
| 7,564,667 B2 * | 7/2009 | Veroni ......................... | 361/93.1 |
| 7,646,308 B2 * | 1/2010 | Paoletti et al. ................ | 340/635 |
| 7,848,897 B2 * | 12/2010 | Williams, Jr. ................... | 702/60 |
| 7,982,404 B2 | 7/2011 | Gordin | |
| 8,163,993 B2 | 4/2012 | Gordin et al. | |
| 8,247,990 B1 | 8/2012 | Gordin et al. | |
| 2006/0237058 A1 | 10/2006 | McClintock et al. | |
| 2007/0223165 A1 * | 9/2007 | Itri et al. ....................... | 361/115 |
| 2011/0007443 A1 | 1/2011 | Crookham et al. | |
| 2012/0168195 A1 | 7/2012 | Gordin et al. | |

OTHER PUBLICATIONS

Permanent Lighting, Control Link Flexible Control Solid Management Automated Scheduling System, retrieved from the Internet: http://www.musco.com/permanent/controllink.html on Jun. 15, 2010 (2 pages).

Musco Lighting—"Control Link—Flexible control and solid management of your facility—saves operating cost and improves service" www.musco.com, 1998, 2007 (12 pages).

NEEL—Ground Fault Monitoring System, retrieved from the Internet: www.neel.in/products5.htm on Jun. 14, 2010 (4 pages).

* cited by examiner

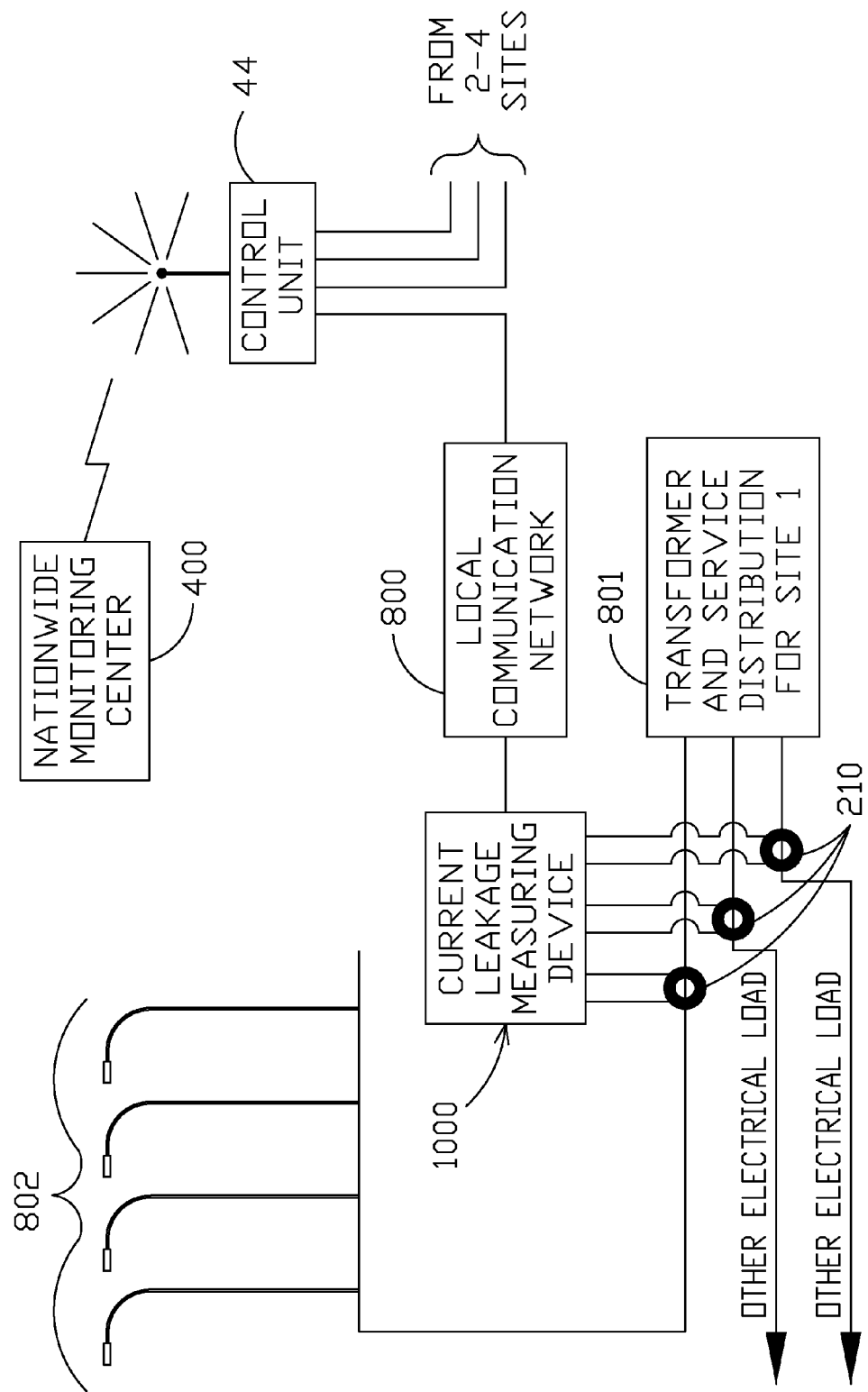

APPARATUS, METHOD, AND SYSTEM FOR MONITORING LEAKAGE CURRENT AND DETECTING FAULT CONDITIONS IN ELECTRICAL SYSTEMS

CROSS-REFERENCE TO RELATED APPLICATIONS

This application claims priority under 35 U.S.C. §119 to provisional U.S. application Ser. No. 61/224,370 filed Jul. 9, 2009, hereby incorporated by reference in its entirety.

I. BACKGROUND OF THE INVENTION

The present invention relates to the active monitoring of leakage current to detect potential fault conditions and provide early warning of future potential fault conditions and/or leakage current measurements that exceed defined threshold settings. More specifically, the present invention relates to a leakage current monitoring service and the implementation and operation thereof to provide said detection and early warning.

Electrical systems and devices are generally designed with various precautions in mind. These precautions typically fall into one of two categories: prevention of occurrences of hazardous or undesired events (e.g., by product testing, insulating energized electrical components from nearby conductive surfaces, controlling failure modes, using devices with overload protection, designing for durability, conducting regular maintenance, etc.), or mitigation of the consequences when hazardous or undesired events occur (e.g., by employing system shut down modes). Recently, said design efforts have been focused on addressing the presence of leakage current in electrical systems.

In the current state of the art, mitigation efforts have been addressed by the design and use of ground fault circuit interrupters (GFCIs); GFCIs are most commonly known for use in household outlets and 120 volt AC circuits. GFCIs mitigate the effects of high leakage current (also known as fault current) by disconnecting power to the entire electrical circuit when an upper limit is reached; this upper limit is predefined according to governing codes (see, for example, UL-943, UL-943C, IEC 60364, and IEC 60479). While GFCI devices are in wide use for low voltage systems, their use has not yet been made integral to equipment-grounded high voltage systems. Further, there are some drawbacks to using a traditional GFCI as a leakage current mitigation device. For example, GFCIs will terminate power to the circuit regardless of the condition that caused the fault even if a fault condition has not actually occurred (e.g., a GFCI may terminate power to a lamp circuit during lamp startup, despite the fact that the increase in leakage current is normal for that combination of system and lamp condition). To address this limitation in home electrical circuits, the National Electric Code (NEC) requires that lighting circuits be wired to a separate circuit than the outlets being protected with GFCIs; this ensures the lights will not go out if the GFCI trips. However, this does not address the situation in which the lighting circuit is the circuit being protected by a GFCI-type device, nor does this provision address the need for a warning that the circuit will be interrupted.

In terms of preventative efforts—particularly for high voltage systems—little has been done regarding leakage current. There are commercially available systems which provide instantaneous leakage current measurements, but these devices do not allow for practical recurrent testing. For example, measurements completed at the time of installation of an electrical system may verify proper operating conditions; however, leakage current may increase over the life of the electrical system due to various reasons (e.g., degradation of the wire insulation over time) and thus, will not be reflected in the initial measurement. Trained personnel could return to the site periodically to measure leakage current, but this may not only be cost-prohibitive and time-consuming, but does not ensure the integrity of the electrical system between site visits.

One example of a commercially available device is the SUPERINTEND™ system available from Neel Industrial Systems Pvt. Ltd., Mumbai, India which uses current measuring devices and a local monitoring unit with display screen to capture the data. This particular system has an optional feature that will send current data to a local computer for viewing; however, local staff familiar with such data must be available to interpret the current measurements and decide on a course of action.

The art would benefit from means and methods of continuously monitoring leakage current in an electrical system and intervening before the use of mitigating devices—such as the aforementioned GFCIs—is necessary. The art would further benefit if such means and methods could be made available for many types of electrical systems (including equipment-grounded high voltage systems) and in a manner that does not require excessive oversight (e.g., interpreting data) or participation (e.g., operating measuring devices) from the user (e.g., owner, operator) of the electrical system. Thus, there is room for improvement in the art.

II. SUMMARY OF THE INVENTION

Disclosed herein are apparatus, methods, and systems for the continuous monitoring of leakage current in an electrical system that employs widely distributed electrical devices and utilizes relatively high voltage (e.g., 277-480 VAC) to operate them; particularly the type of electrical system with extended wire runs (which makes the use of low voltage economically impractical). However, aspects according to the present invention are not limited to such system. As disclosed herein, continuous monitoring comprises measuring leakage current at a reasonable sampling rate (e.g., on the order of once per minute) while the electrical circuit in question experiences leakage current above the noise level (i.e., when the circuit is energized). However, continuous monitoring could be defined otherwise (e.g., comprising a sampling rate of once/second and measuring leakage current even when power to the electrical circuit in question is terminated) and not depart from aspects of the present invention.

There are a wide variety of electrical systems which may benefit from aspects of the present invention. For example, the ability to identify increases in leakage current before they approach dangerous levels (e.g., as defined by the aforementioned governing codes) is particularly attractive for electrical systems which are accessible by untrained personnel (e.g., street lights, sports lighting systems) or do not have protective measures (e.g., fences) to ensure persons do not come in contact with conductive equipment components; aspects according to the present invention may minimize electrical shock hazards in these situations. As another example, the ability to track leakage current over time is particularly attractive for identifying electrical systems with substandard workmanship or deteriorating components; aspects according to the present invention may help identify improper electrical connections or degradation of insulation.

It is therefore a principle object, feature, advantage, or aspect of the present invention to improve over and/or solve problems and deficiencies in the state of the art.

Further objects, features, advantages, or aspects of the present invention may include one or more of the following:
1. providing a leakage current monitoring service including, but not limited to:
    i. providing and installing equipment for measuring leakage current in an electrical system,
    ii. measuring and monitoring leakage current in the electrical system, and
    iii. responding to changes in the measured and monitoring leakage current according to at least one combination of threshold and protocol;
2. characterizing the electrical circuit(s) in the electrical system being monitored and measured so to:
    i. avoid false threshold violations,
    ii. provide guidance in assisting with a system shutdown,
    iii. aid in defining a protocol and/or threshold, and/or
    iv. aid in building a knowledge base;
3. collecting, storing, and analyzing leakage current measurements from a variety of locations, equipment, and electrical systems from a single location, and
4. providing an optional bypass system which allows a qualified user to diagnose potential fault conditions, undesirable trends in leakage current measurements, and/or threshold violations in the electrical system.

These and other objects, features, advantages, or aspects of the present invention will become more apparent with reference to the accompanying specification.

III. BRIEF DESCRIPTION OF THE DRAWINGS

From time-to-time in this description reference will be taken to the drawings which are identified by figure number and are summarized below.

Figure 6:
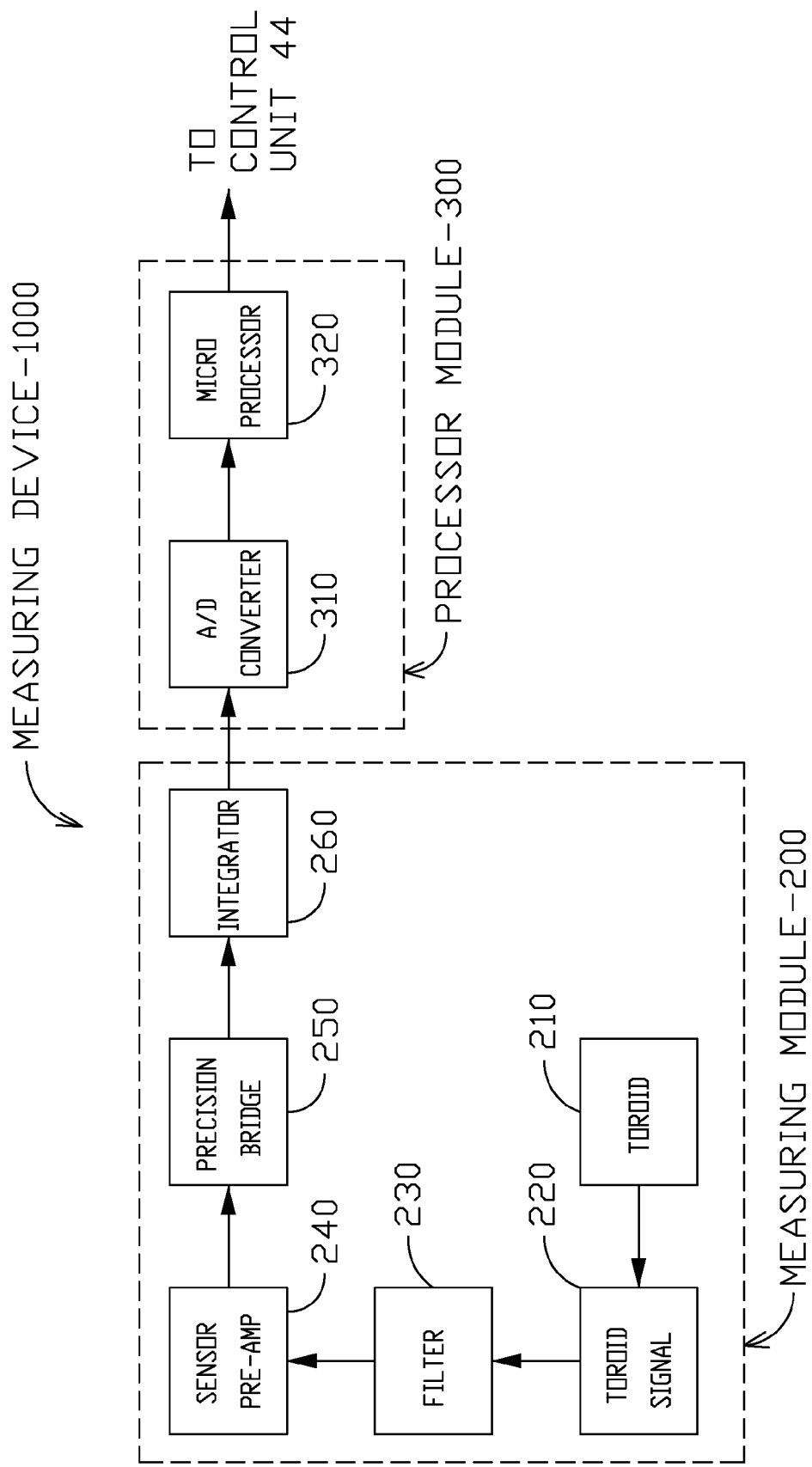

FIG. 6 diagrammatically illustrates a leakage current measuring module and processor module according to an aspect of the invention.

Figure 7:
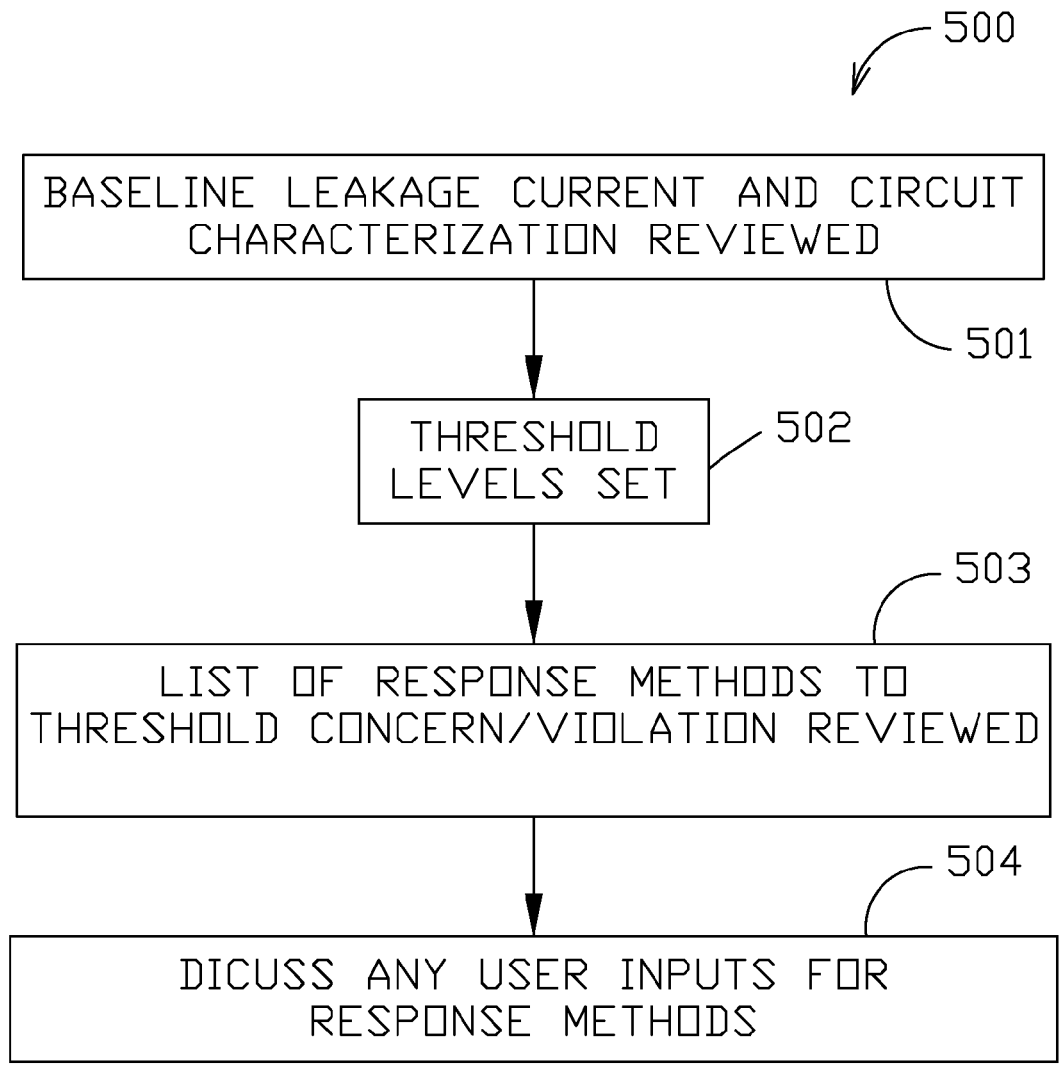

FIG. 7 illustrates in flowchart form a method of determining threshold levels and response protocols according to an aspect of the invention.

Figure 8:
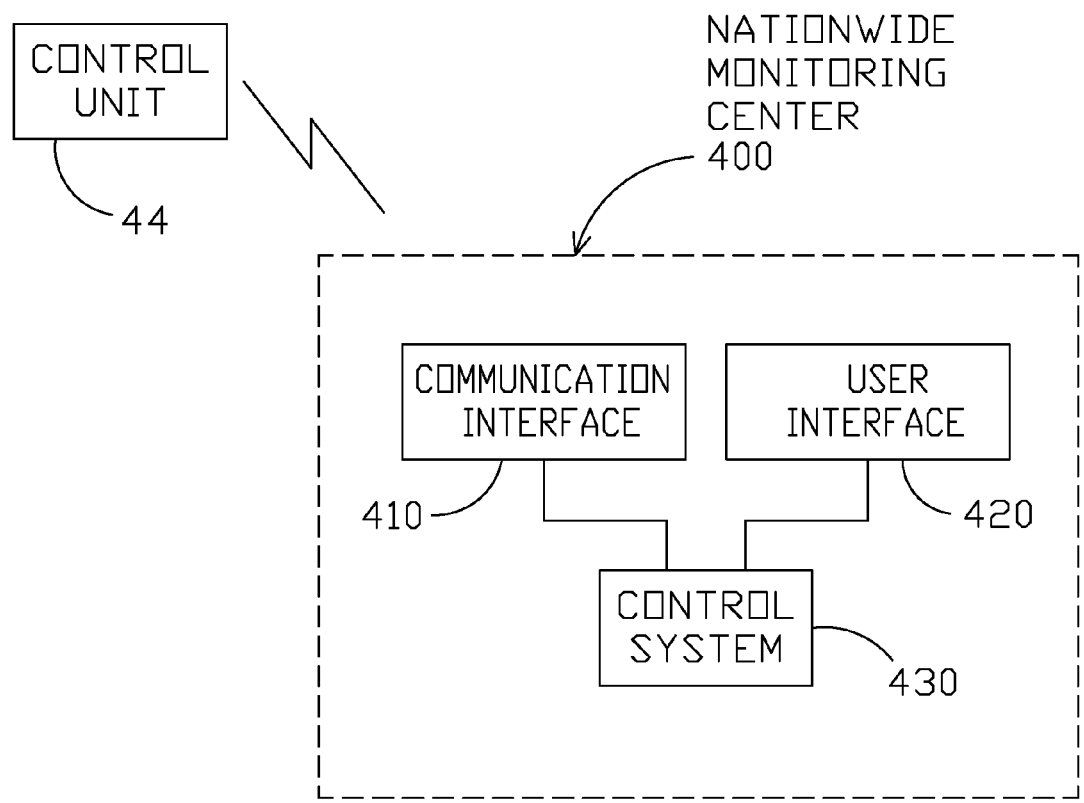

FIG. 8 diagrammatically illustrates a nationwide monitoring center according to an aspect of the invention.

Figure 9:
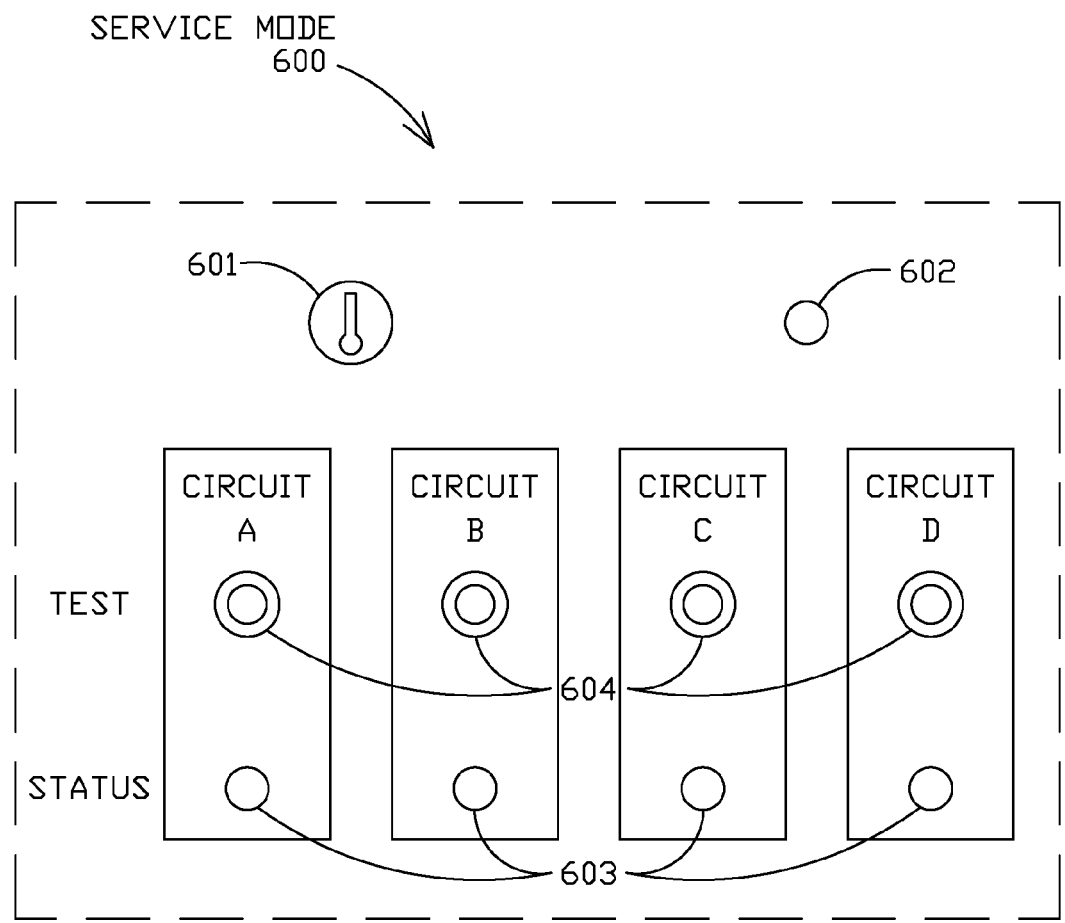

FIG. 9 diagrammatically illustrates a service mode module according to an aspect of the invention.

FIG. 10 illustrates an alternative embodiment according to aspects of the invention including a street lighting system and communication therefrom with a nationwide monitoring center.

IV. DETAILED DESCRIPTION OF EXEMPLARY EMBODIMENTS

A. Overview

To further an understanding of the present invention, specific exemplary embodiments according to the present invention will be described in detail. Frequent mention will be made in this description to the drawings. Reference numbers will be used to indicate certain parts in the drawings. The same reference numbers will be used to indicate the same parts throughout the drawings unless otherwise indicated.

As has been stated, safety concerns (e.g., electrical shock hazards) in an electrical system are typically addressed via preventative or mitigation efforts. Commercially available GFCIs, while effective as mitigation-type devices, do not prevent a fault condition from occurring. For example, a difference between conventional GFCI systems and a preventative-type system (such as the monitoring system envisioned and described herein) is that a GFCI system will automatically shut off power if a fault is detected; a monitoring system may not do so. The monitoring system described herein, for example, is designed to allow for preventive measures to be taken to protect the casual user from experiencing any hazardous condition while in the vicinity of the circuit by providing an early detection or prediction of problem(s) that may require investigation or maintenance; according to one aspect of the present invention, via a subscribable service. With early detection, maintenance can be performed to prevent the hazardous event from occurring.

Further, for appropriate situations (some of which are described herein) a monitoring system according to aspects of the invention may provide more of a relative response in that the threshold value can be based on criteria and conditions that are meaningful for the given site and user; this is in direct contrast to most commercially available mitigation-type devices which have a threshold which is preset and not adjustable. For example, if an electrical system has 800 feet of wire running underground with 30 mA of leakage that is uniformly distributed throughout the length of the wire, appropriate person(s) may determine that level of leakage current is acceptable for that condition. However, commercially available GFCI devices will typically interrupt the circuit at that level of leakage current. Further, if environmental conditions change (e.g., it rains at the site) leakage current may rise (e.g., to 50 mA); a monitoring-type system could recognize this as a normal operating condition and not a fault condition. Thus, aspects according to the present invention seek to characterize each electrical circuit being monitored such that the envisioned large scale (e.g., nationwide) monitoring service may provide customized evaluation of the overall "health" of the electrical system (in terms of leakage current) and what hazards it may pose to persons.

Figure 1:
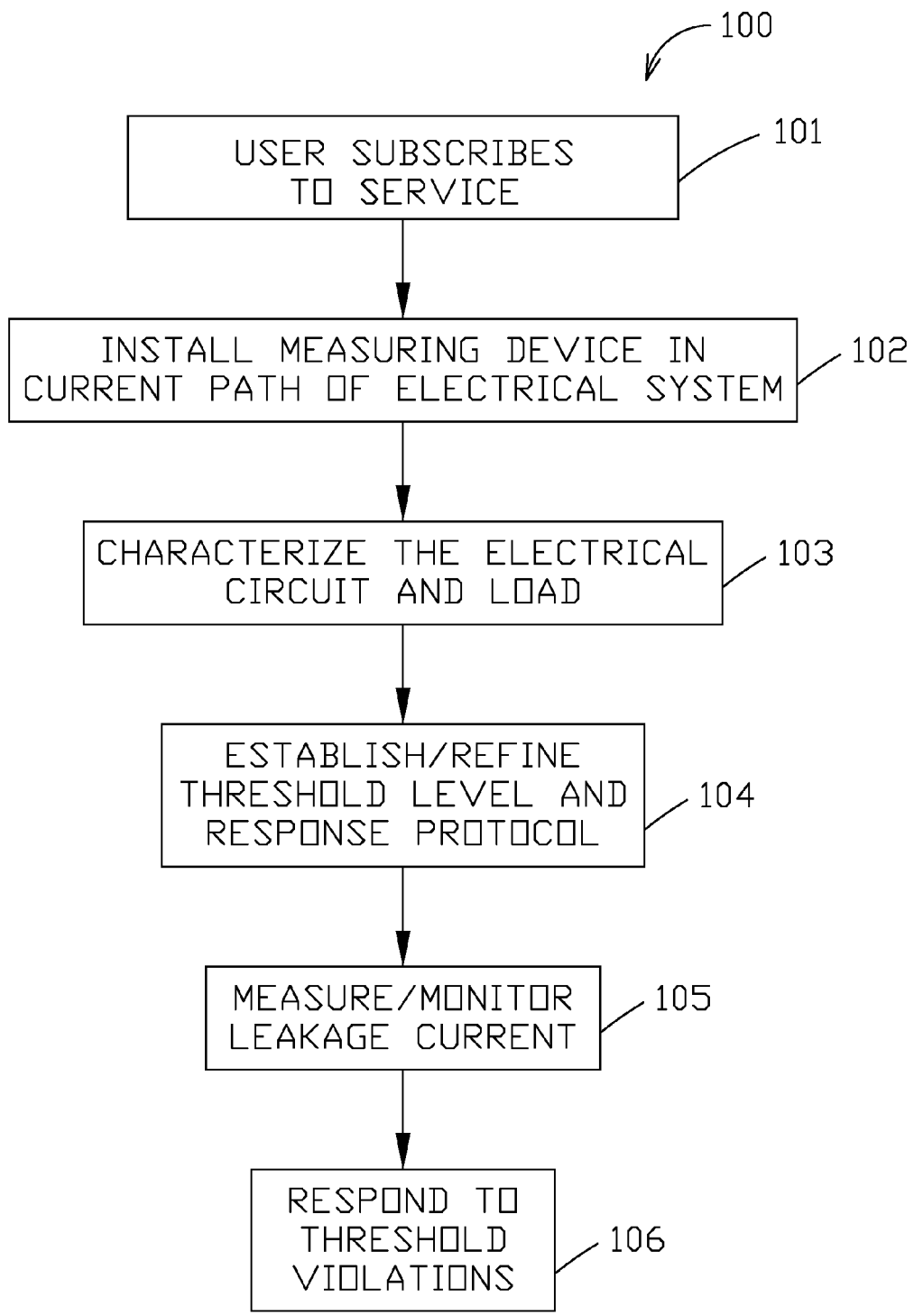
FIG. 1 illustrates in flowchart form a method of providing a leakage current monitoring service according to an aspect of the invention.

An exemplary method (see reference no. 100) for providing a leakage current monitoring service is illustrated in FIG. 1 and may generally be characterized according to the following.

Figure 2:
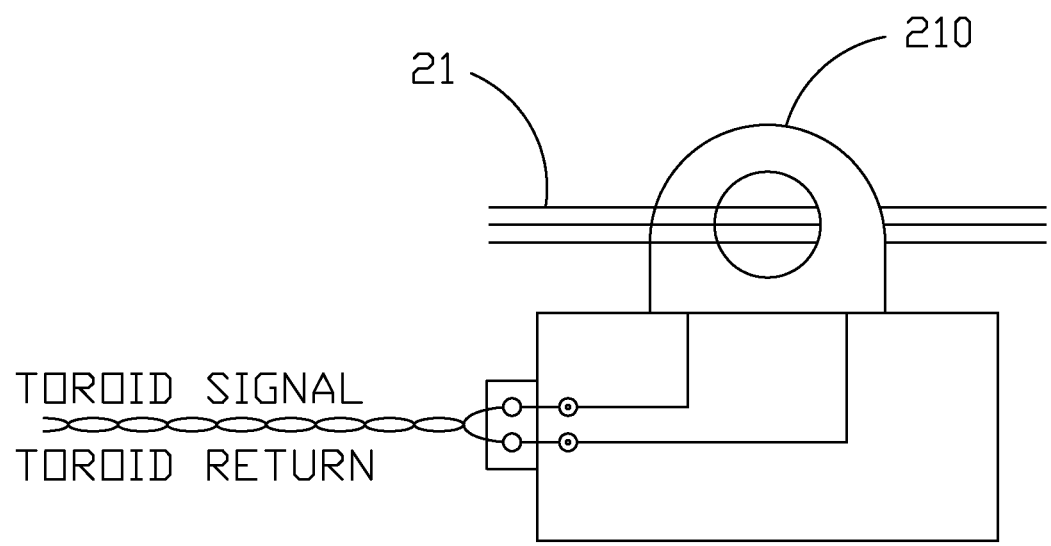
FIG. 2 illustrates one typical apparatus for measuring leakage current according to an aspect of the invention.

1. A user subscribes to the monitoring service (see reference no. 101).
    i. Subscription could be included with the purchase of a new electrical system (e.g., if the company providing the monitoring service also provides the electrical system and the equipment associated with the monitoring service). Alternatively, subscription could be requested by the owner/user of an existing electrical system and/or provided by a company not associated with the manufacture or distribution of the existing electrical system (e.g., if the company providing the monitoring service also provides the equipment associated with the monitoring service but does not provide the actual electrical system).
  ii. Subscription could be facilitated via phone, email, website, fax, CD sent to the user/owner, etc., and may include, but is not limited to:
    a. establishing means and methods of billing (e.g., direct withdraw from a checking account on a monthly basis);
    b. establishing user preferences for reports issued by the monitoring service regarding the leakage current status of the electrical system being monitored (e.g., a user may specify receiving a paper report on a monthly basis that indicates impending and actual threshold violations but does not indicate non-essential data (e.g., daily averages that fall within the range of normal operation));
    c. establishing a response protocol for impending threshold violations (e.g., phone call, email, documenting the concern in the issued report, etc.);
    d. establishing a response protocol for actual threshold violations (e.g., a user may specify an automatic shutdown of the affected electrical circuit which may be facilitated remotely from the monitoring service with appropriate equipment installed in the electrical system); and
    e. documenting any special requests or concerns that a user may have.
2. A qualified professional (presumably associated with the monitoring service, though this is not required) installs the leakage current measuring equipment in the current path of the electrical system (see reference no. 102).
  i. An example of a well known device capable of measuring leakage current is a current transformer (also known as a CT, toroid, or current-sensing toroid) 210 illustrated in FIG. 2. As can be seen from FIG. 2, toroid 210 surrounds each phase of power wiring 21 (also known as power lines or conductors). When leakage current is minimal, the instantaneous sum of the measured current by toroid 210 is zero or near zero. If any of the electrical energy flows to ground, then an imbalance of current occurs in conductors 21 and is detected by toroid 210. Other methods of measuring current are possible and envisioned.
3. A qualified professional (presumably the same professional who installed the leakage current measuring equipment, though this is not required) works with the monitoring service to characterize the electrical circuit and load (see reference no. 103).
  i. The portion of the characterization which includes both the professional onsite and the monitoring service may include, but is not limited to:
    a. confirming the ability to facilitate an automatic circuit shutdown (e.g., if the user-selected response protocol for a threshold violation includes automatic circuit shutdown);
    b. identifying which electrical circuits within the electrical system are being monitored and identifying the load (e.g., resistive, capacitive, inductive, combination, etc.) associated with each monitored electrical circuit;
    c. establishing a manual shutdown process (e.g., if the user-selected response protocol for either impending or actual threshold violations includes being contacted so a local staff member may shut down the system); and
    d. establishing one or more baseline leakage current measurements (e.g., by direct measurement, an average of historical data from the systems or similar system, etc.) and ensuring correct operation of the leakage current measuring equipment and/or the electrical system.
  ii. Further characterization may be performed by the monitoring service, qualified professional, or both (e.g., based on monitored data from similar applications, input from the user, input from a manufacturer, data from field testing, etc.) and may include, but is not limited to:
    a. defining known operating characteristics of the load (e.g., identifying times during operation when leakage current may be high, but due to a cycle of operation and not a fault condition);
    b. evaluating environmental factors (e.g., soil conductivity, average rainfall, etc.) to identify times when leakage current may be high but not due to a fault condition;
    c. defining trends in leakage current data (e.g., peak-to-noise ratio) which define normal operation versus impending threshold violations; and
    d. defining one or more threshold levels (e.g., a first level which triggers the user-selected response for an impending threshold violation and a second level which triggers the user-selected response for an actual threshold violation).
4. The monitoring service may then contact the owner/user of the electrical system to further establish or refine threshold levels and response protocols (see reference no. 104).
  i. This step may be omitted if there is no need to further establish or refine threshold levels and/or response protocols (e.g., if the electrical system was purchased from the monitoring service, there were no questions or concerns from the user during the subscription step (see reference no. 101), and there were no questions or concerns from the qualified professional during the installation or characterization steps (see reference nos. 102 and 103, respectively)). Some examples of when step 104 is needed may include, but is not limited to:
    a. if the user/owner has a special request that is not easily satisfied or will require additional cost (e.g., if a user/owner requests that the electrical system visibly indicates that a threshold has been violated and the system has no such means, the monitoring service may discuss the installation of a visual indicator (e.g., flashing light) which is in remote communication with the monitoring service);
    b. if the user/owner makes a request that does not comply with policies of the monitoring service (e.g., if the user/owner declines automatic shutdown of the electrical system (in whole or at the affected circuit only) in the event of a threshold violation and has the means to do so, the monitoring service may discuss a safety waiver);
    c. if characterization of the electrical system yields information which requires further discussion with the owner/user (e.g., if baseline leakage current measurements exceed what is deemed safe by governing codes (e.g., UL-943); and
    d. the user simply wants to be aware of what the threshold levels are (e.g., if the user/owner must provide such information to a local governing body).

5. The monitoring service continuously monitors and measures leakage current (see reference no. 105).
   i. Continuous, as described herein, comprises sampling at a reasonable rate (e.g., on the order of once per minute) while the electrical circuit in question experiences significant leakage current (e.g., of greater magnitude than the noise typically present in the electrical system). However, continuous monitoring could be defined otherwise (e.g., comprising a sampling rate of once per second and measuring leakage current even when power to the electrical circuit in question is terminated).
   ii. Continuous monitoring and measuring of leakage current allows characterization of the electrical system according to step 103 to be refined over time (e.g., by filtering out transients or other conditions that are verified as normal conditions of the electrical circuit).
6. The monitoring service responds to impending violations (also referred to as threshold concerns) and actual violations of the threshold level(s) defined according to steps 103 and 104 in accordance with the response protocol defined in steps 101 and 104 (step 106).

B. Exemplary Method and Apparatus Embodiment 1

A more specific exemplary embodiment, utilizing aspects of the exemplary method described above, will now be described. This first exemplary embodiment describes the scenario in which a customer wants to subscribe to a monitoring service for a new electrical system (in this example, an outdoor sports lighting system—see FIGS. 5A and B) wherein both the lighting system and the monitoring service are available from the same provider.

According to this first embodiment, the customer (e.g., owner of the site, purchaser of the service, user of the electrical system, etc.) subscribes to the monitoring service (see step 101 of method 100) when purchasing the lighting system. As part of the purchasing agreement the user is instructed to visit the company's (hereafter referred to as Company X) subscription registration website and fill out the necessary subscription information. Webpage 700 (see FIG. 3) is a typical representation of the envisioned website interface and may generally be characterized according to the following.
1. The user fills out field 701 to designate the organization associated with the purchase of the monitoring service; it is of note that this may not be the same organization associated with the purchase of the lighting system (e.g., a city government may purchase the lighting system but the parks and recreation division of that governmental organization may be specifically responsible for purchasing and maintaining the monitoring service).
2. The user chooses a billing option from drop-down menu 702; some other options for this field may include quarterly direct withdraw, yearly paper bill, etc. If the user wants to specify an account for direct withdraw that is not the same account used to purchase the lighting system, this information may be recorded in field 710. Other methods of billing are possible, and envisioned.
3. The user specifies the content of the monthly report and how the user prefers to receive the monthly report; it is of note that according to the present embodiment reports are issued monthly, however, the frequency could be user-defined or otherwise.
   i. Drop-down field 703 allows the user to select how the information in the report is presented (e.g., graphically, textually, etc.).
   ii. Drop-down field 704 allows the user to select how much information is included in the report (e.g., full detail including all events (e.g., each time the lights were turned on, each time the lights were turned off, and how long the lights were on each time) and leakage current measurements, minimal detail including only an indication of the status of each monitored circuit (e.g., a list of any impending threshold violations or actual threshold violations and when they occurred during the month), etc.).
   iii. Drop-down field 711 allows the user to select how to receive the report (e.g., via email, via mail, etc.). If the user wants to use information other than what is documented for the purchase of the lighting system (e.g., a different mailing address for a mailed report), this information can be recorded in field 712.
   iv. Field 705 is populated with explanations of the selections made in fields 703 and 704. As envisioned, field 705 refreshes when a new selection is made such that the user can evaluate the various combination of options. Field 705 could be further expanded to explain any of the fields in webpage 700.
   v. FIG. 4 illustrates one possible format for a monthly report 2000. According to the selection in field 703 of FIG. 3, both graphics and text are included in the report and according to the selection in field 704 of FIG. 3, a full event log is listed for each monitored circuit in the electrical system; in this example the electrical system comprises the four-pole lighting system illustrated in FIGS. 5A and B.
4. The user chooses a response to threshold concerns from drop-down menu 706; some other options for this field may include contact via phone, indicate on the monthly report but do not contact directly, etc. Other response methods are possible, and envisioned. If the user wants to use information other than what is documented for the purchase of the lighting system (e.g., a different email address for notification of impending threshold violations), this information can be recorded in field 707.
5. The user chooses a response to actual threshold violations from drop-down menu 708; some other options for this field may include contact via phone, visually indicate the condition at the site, automatic shutdown and dispatch a technician, etc. Other response methods are possible, and envisioned.
   i. If both the electrical system and the monitoring service are available from the same company (as is the case in the present exemplary embodiment), it is likely that automatic shutdown will be the default selection (e.g., due to liability, conformance to governing codes, etc.). If a user does not want automatic shutdown and chooses a different option from drop-down menu 708, a new window could open which presents a waiver the user must sign.
   ii. As envisioned, the default response (i.e., automatic shutdown) causes shutdown of the affected monitored circuit only, however, it could cause shutdown of a portion of the overall electrical system or the entire electrical system.
6. The user may record any specific requests or comments (e.g., request to send copies of the bill to another organization, request for a phone call to discuss response options not listed in drop-down menus, etc.) in field 709.

Figure 5A:
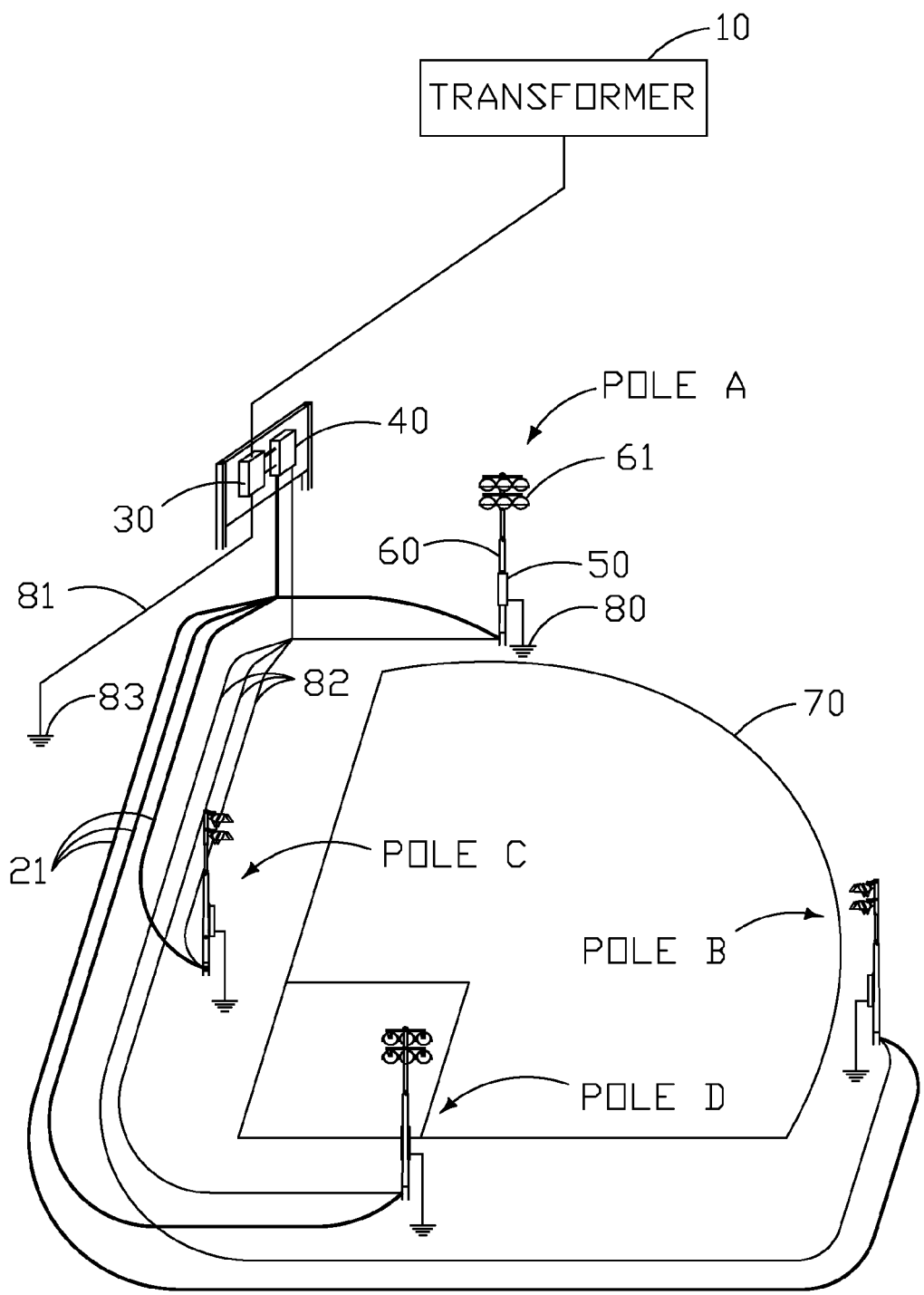
FIG. 5A illustrates a first embodiment according to aspects of the invention including a conventional sports lighting system.

After subscription step 101 is complete—along with any other paperwork required to purchase the lighting system—the lighting system is installed at the designated site. In this exemplary embodiment Company X is providing both the lighting system and the monitoring service so installation of the measuring device equipment (see step 102 of method 100) may occur in part at Company X prior to shipping; though this is by way of example and not by way of limitation. FIGS. 5A and B illustrate what the electrical system could look like once installed, and may generally be characterized according to the following.

The flow of power generally comprises delivery from a transformer 10 (e.g., as may be provided by a utility company) to a distribution enclosure 30. Enclosure 30 includes breakers (see reference no. 31) which further distribute power along power lines 21 to each circuit housed in control enclosure 40. Power flows through distribution blocks 43, contactors 41, and a current measuring module 200 before continuing along power wires 21 to an equipment enclosure 50. At enclosure 50 power flows through a disconnect switch 52 and distribution block 43 where ultimately, power to lamps 61 is regulated by ballast 51 and capacitor bank 53.

The combination of ballasts and capacitors to regulate power to lamps is well known in the art; U.S. Pat. No. 7,176,635 incorporated by reference herein discusses such means and methods.

Generally, equipment and earth grounding is provided to help prevent electrical shock hazards and ensure a low impedance path to ground (e.g., in the event of lightning striking poles 60). For the system illustrated in FIGS. 5A and B, such grounding is provided by grounding electrodes 80 and 83 and grounding wires 81 and 82, though this is by way of example and not by way of limitation.

Generally, a user can control operation of the lighting system locally or by allowing control by a remotely located control center. A control unit 44—which controls actuation of contactors 41 to open and close the electrical circuit—is typically enabled with an on-off-auto (OOA) switch. To turn the lights on and off locally, a user may place the OOA switch in the on and off positions, respectively. When the OOA switch is placed in the auto position, the remotely located control center communicates control instructions to control unit 44; in this example, via an antenna 42.

U.S. Pat. No. 6,681,110 incorporated by reference herein and commercially available under the trade name CONTROL-LINK® from Musco Sports Lighting, LLC, Oskaloosa, Iowa illustrates one example of a remotely located control center and methods of controlling an electrical system therefrom. As may be appreciated by one skilled in the art, the commercially available CONTROL-LINK® product may differ from that described in U.S. Pat. No. 6,681,110 as the mode of communication between an onsite component and a central server discussed in said patent (e.g. analog cellular signal) may currently comprise alternate modes of communication (e.g. satellite, Global System for Mobile communications (GSM), Code Division Multiple Access (CDMA), etc.).

Figure 5B:
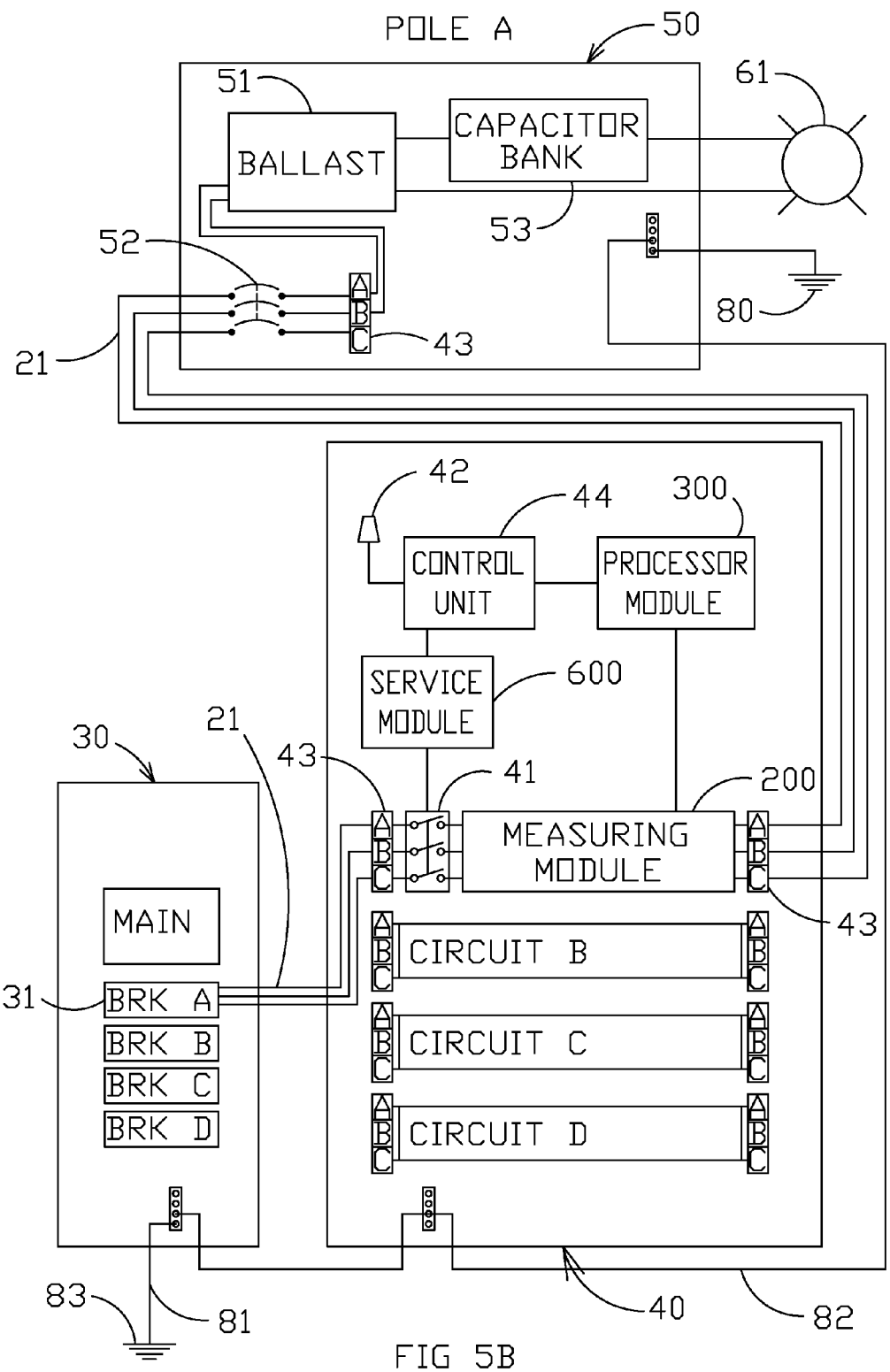
FIG. 5B illustrates a partial block diagram of the components in FIG. 5A including leakage current measuring equipment according to an aspect of the invention.

According to stop 102 of method 100 the current measuring device (see reference no. 1000) is installed in the current path of the electrical system. As can be seen from FIGS. 5B and 6, current measuring device 1000 comprises a current measuring module 200 and a processor module 300, both of which are operatively connected to the existing control unit 44; again, control unit 44 may be preexisting if the lighting system is enabled with remote control capability—Exemplary Method and Apparatus Embodiment 2 illustrates a system in which there is no control unit and step 102 of method 100 includes installation of a control unit. It is of note that for the sake of brevity only one measuring module 200 is shown in FIGS. 5B and 6, however, one skilled in the art would know that for a system with multiple circuits (e.g., the system illustrated in FIG. 5A), multiple measuring modules 200 would be required; however, processor module 300 could be shared by multiple circuits with one A/D channel per measuring module input.

According to the present embodiment, step 102 includes installation of an optional service module 600 (see FIGS. 5B and 9); service module 600 is designed to bypass control unit 44 in the event of a circuit shutdown to aid in troubleshooting—service module 600 is discussed in further detail below.

Following installation of the appropriate leakage current measuring equipment (which in this example includes device 1000 and service module 600), qualified onsite personnel may assist the monitoring service in characterizing the electrical circuits and loads according to step 103 of method 100. In the present embodiment Company X provides both the monitoring service and the electrical system so it is assumed that in this example both remote control of the lighting system and monitoring/measuring of leakage current occurs from the same location (what is referred to in the figures as nationwide monitoring center 400). Further, it is assumed that the same personnel involved with installing the electrical system are the personnel involved with step 103 (e.g., to avoid having to send additional personnel to the site). However, this is by way of example and not by way of limitation.

According to step 103 the electrical circuits and load are characterized. This may involve a variety of activities; some examples include verifying voltage and current at different points in the circuit, confirming monitoring center 400 is able to shutdown a portion or all of the lighting system (depending on the selected response protocol) remotely via control unit 44, labeling each monitored circuit so reports are consistent, documenting how a manual shutdown may be facilitated, establishing baseline leakage current measurements, or otherwise. This is an important step because each electrical system is unique in its leakage current behavior. For example, the system illustrated in FIGS. 5A and B employs multiple high intensity discharge (HID) lamps 61 which cause a range in leakage current depending on the phase of operation, none of which necessarily indicate an impending or actual threshold violation. The different phases encountered during normal operation of a ballast-capacitor-lamp electrical system are well known in the art and can generally be characterized by the following.

Ignition phase—Initial power applied to the ballast-capacitor-lamp circuit results in the high impedance lamp element transitioning to lower impedance as the phase progresses.

Warm-up phase—The phase initiates immediately after ignition, and lasts until the lamp element reaches its stable operating temperature. During this phase the lamp circuit responds like a simple resistive load and measured imbalance leakage current appears as a sinusoidal wave.

Lamp operating phase—During the operating mode, measurement of the imbalance leakage current will differ in value and shape from the waveform measured during the warm-up phase.

Cool-down phase—If the operating phase is terminated and power is restored to the lamp before it has reached the ignition phase temperature, the lamp undergoes a cool-down phase until the ignition phase resumes. During this phase, measurement of the imbalance leakage current will differ in value and shape from both the warm-up phase and lamp operating phase since the lamp element is again in a high impedance state.

Understanding these phases of lamp operation and obtaining baseline measurements during each is but one approach to step 103 of method 100; approaches may be tailored to the particular electrical circuit. Further, such a detailed and consummate approach to step 103 allows monitoring center 400 to build a knowledge base such that (i) cause-and-effect relationships can be developed and used to predict threshold violations and (ii) the knowledge base can become a resource for diagnosing problems in other electrical system monitored by nationwide monitoring center 400.

After characterizing the electrical circuit and load according to step 103 of method 100—which as envisioned, is best accomplished with both persons onsite and persons at monitoring center 400, though this is by way of example and not by way of limitation—threshold levels and response protocols may be further established or refined according to step 104 of method 100. In the present embodiment this is facilitated according to method 500 (see FIG. 7), though this is by way of example and not by way of limitation.

According to method 500, personnel at nationwide monitoring center 400 review the baseline leakage current measurements and characterization of the circuits completed in step 103 of method 100 (see reference no. 501); it is of note that any of the steps in method 500 may require communication between onsite personnel and personnel at monitoring center 400. Following this, monitoring center 400 may evaluate factors pertinent to the site (e.g., soil condition, governing codes, etc.) and establish one or more threshold levels (see reference no. 502). For example, for the system illustrated in FIGS. 5A and B, monitoring center 400 may evaluate baseline leakage current values and, not finding any concerns or anomalies, set a threshold violation level at 6 mA and a threshold concern level at 4 mA in accordance with UL-943, but only apply those thresholds when lamps 61 are in the lamp operating phase (i.e., not during ignition, warm-up, or cooldown). Monitoring center 400 knows when lamps 61 are in the lamp operating phase because the load characteristics were determined according to step 103 of method 100; further, many lighting systems have a timer that tracks lamp operating hours (see the aforementioned U.S. Pat. No. 7,176,635) which can be communicated to center 400 via control unit 44.

Figure 3:
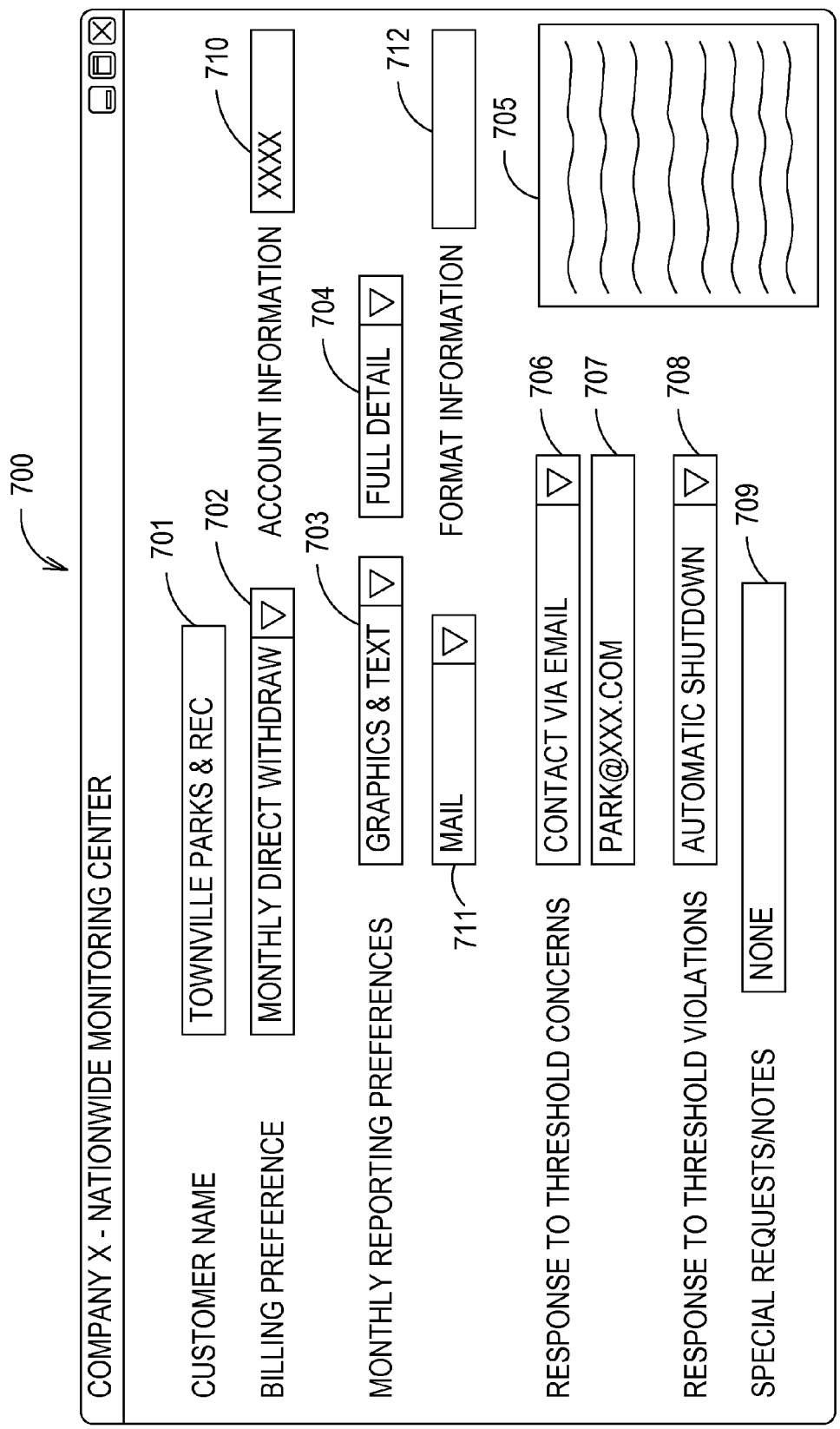
FIG. 3 illustrates a webpage as one possible forum for communicating customer subscription preferences according to an aspect of the invention.
Figure 4:
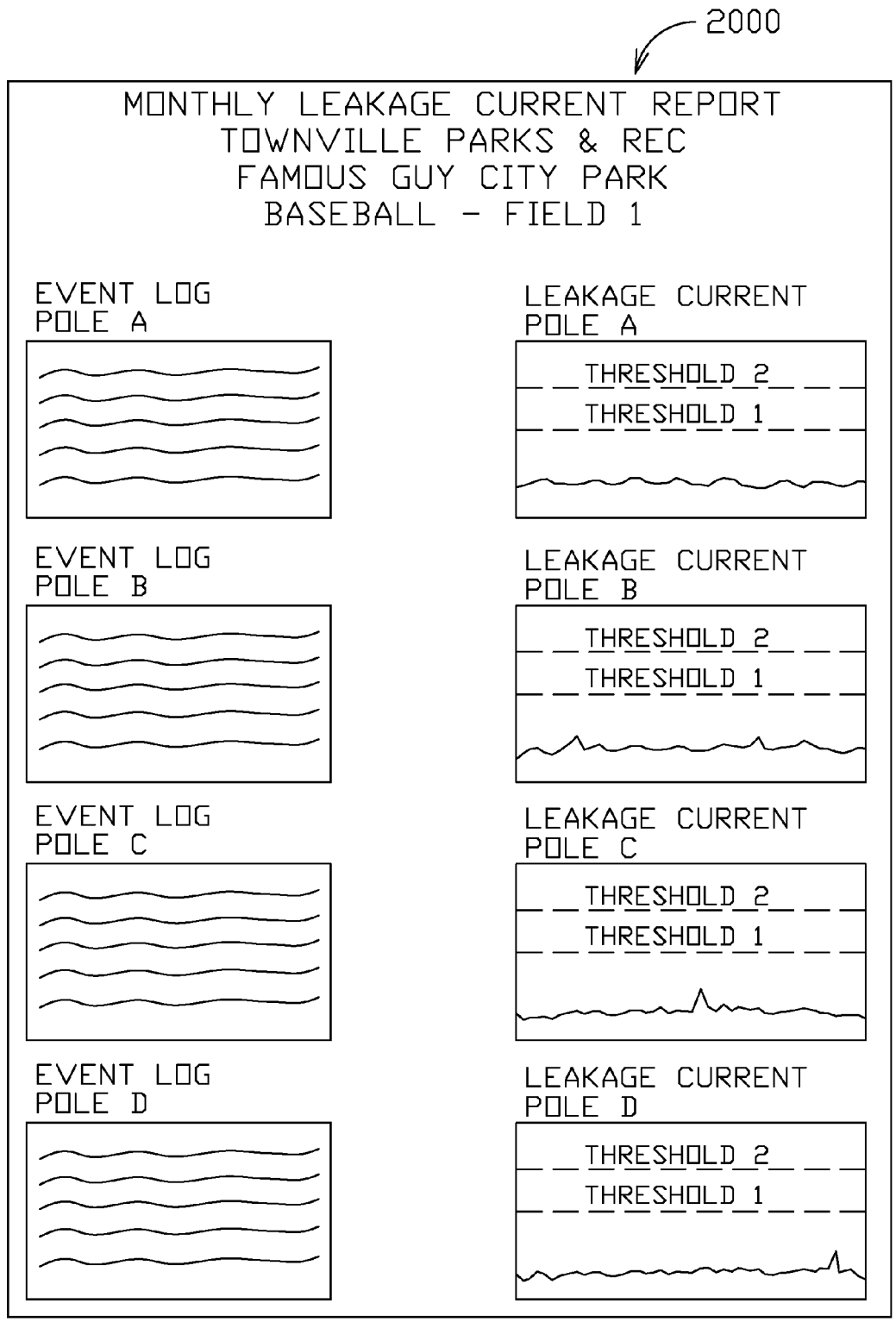
FIG. 4 illustrates one possible form of report according to the customer subscription preferences illustrated in FIG. 3.

Following this (see reference no. 503), monitoring center 400 reviews the customer responses collected during step 101 of method 100 (see also FIG. 3). If there is a need to discuss matters with the user (e.g., the user had a special request listed in field 709 of webpage 700 (e.g., the customer requests no automatic shutdown, even though the system is capable of such), step 103 of method 100 could not be completed due to unsafe conditions (e.g., abnormally high leakage current measurement prevented properly characterizing the system), step 501 of method 500 yields information contrary to customer input on webpage 700 (e.g., the customer requests a visual indication of a threshold violation but the system has no such means), etc.), monitoring center 400 may contact the user (see reference no. 504). For example, in the present embodiment nationwide monitoring center 400 would review webpage 700 with respect to the lighting system illustrated in FIGS. 5A and B. As can be seen from FIG. 3 there are no special requests (see reference no. 709) and the response to threshold violations (see reference no. 708) indicates an automatic shutdown. Monitoring center 400 has already confirmed the system is both capable of an automatic shutdown and that such shutdown operates correctly during step 103 of method 100, and so may decline to contact the user (see reference no. 504).

Ultimately, by the end of step 104 of method 100, all thresholds and responses should be agreed upon and implemented. However, thresholds and responses can be updated over time for a number of reasons (e.g., site conditions change, a customer requests a new response, etc); any updates would be facilitated according to method 100.

Following completion of step 104 of method 100, the user may operate the lighting system as desired while monitoring center 400 measures and monitors leakage current according to step 105. In the present embodiment, since both remote operation of the electrical system and leakage current monitoring occurs from the same location, other data (e.g., voltage, day, time, site conditions, etc.) could be collected and added to the knowledge base. The measuring of leakage current and the monitoring thereof may generally be characterized according to the following.

1. As previously described, power flows through lines 21, distribution block 43, and contactors 41 (which are in the closed position during operation) before reaching measuring module 200.
2. In measuring module 200 a toroid 210 (see FIGS. 2 and 6) surrounds power wires 21 for each monitored circuit and produces an analog signal 220 which is filtered 230, stabilized and amplified 240, rectified to produce a fully positive waveform signal 250, and integrated 260.
   i. In the present embodiment, toroid 210 attenuates signals above 2 kHz and produces a linear response for AC current in the ranges of 50 Hz-2 kHz (2 mA-100 mA) to help eliminate noise peaks (e.g., due to contactor bounce in the lighting circuit), though this is by way of example and not by way of limitation. For example, this particular approach to filtering data may not be needed if the electrical load does not include contactors or lamps.
   ii. In the present embodiment, a low pass filter in the feedback circuit of pre-amp 240 prevents it from being overdriven, though this is by way of example and not by way of limitation.
3. In processor module 300 a converter 310 converts the analog signal to digital and a processor 320 processes local logic (e.g., sampling rate, averaging, maximum value per timeframe, etc.) and transmits data to control unit 44.
   i. In the present embodiment, data is sampled on the order of once every second the circuit is energized (i.e., when the lights are powered) and the daily maximum leakage current measurement is transmitted to control unit 44, though this is by way of example and not by way of limitation.
   ii. Processor 320 could process other logic (e.g., comparing measurements to the defined threshold).
4. Data at control unit 44 is transmitted to the remotely located nationwide monitoring center 400 (see FIG. 8) via a communication interface 410 (e.g., TCP/IP). The data is processed, stored, and otherwise computed (e.g., run through the appropriate algorithms to produce monthly reports, analyze trends, etc.) at a central control system 430. A user interface 420 (e.g., web browser) in operative connection with control system 430 allows personnel at monitoring center 400 to access leakage current data. In the present embodiment (i.e., where monitoring center 400 both remotely operates the lighting system and monitors leakage current), personnel may perform and/or coordinate any of the following, though are not limited to such:
i. monitor leakage current;
ii. review other data or communication from control unit 44 (e.g., voltage, contactor status, etc.);
iii. review customer requests (e.g., review requests for changes to threshold levels and/or response protocols); and
iv. interface with general system operation (e.g., communicate on/off lighting schedules to control unit 44).

The final step in method 100 (see reference no. 106) is to respond to threshold violations (which includes threshold concerns and actual violations) in accordance with the response protocol developed in step 101 and further developed/refined in step 104. Ideally, once step 104 is complete, the monitoring service will not be perceivable to the user (with the exception of the monthly report); measuring and monitoring of leakage current will continue according to step 105 and if the system is operating normally, no thresholds will be approached or reached and no responses will be triggered. This is one of the benefits of the envisioned monitoring service; the user does not have to worry about regular measuring and monitoring but is assured he/she will be notified of a potential problem.

The way in which monitoring center 400 responds to a threshold violation, and even the way in which the equipment responds to the threshold violation, can vary from system to system and is dependant on the user-selected response protocols. For example, assume a user defined the response protocol illustrated in FIG. 3 for the system described above and illustrated in FIGS. 5A and B. As has been stated, for this particular system a first threshold has been set for 4 mA and a second threshold set for 6 mA. So in accordance with FIG. 3, if the leakage current measures 4 mA the user will be emailed (see fields 706 and 707) and if leakage current measures 6 mA the circuit will be automatically shut down. However, as has been stated, data is sampled once per minute and the daily maximum is sent to control unit 44 and further on to monitoring center 400 for analysis; this presents a non-ideal solution because a threshold violation occurring when the system is first started will not be identified until the next day when personnel could identify the violation and send a command to control unit 44 to terminate power to the circuit.

To prevent such situations, processor 320 may be programmed with instructions that in the event of an actual violation (e.g., leakage current measuring 6 mA) instruction is sent to control unit 44 to terminate power (e.g., disengage contactors 41) and send communication to monitoring center 400 (e.g., send an immediate contactor status update); hence, an automatic shutdown of the affected electrical circuit. This action could also be coordinated with any available local alarms or visual indicators to indicate the status of the system. However, such drastic action is not needed for a threshold concern (e.g., leakage current measuring 4 mA) so the approximately one day delay may be acceptable. Thus it can be seen that to provide a truly customized approach to leakage current monitoring and response, it requires a combination of measuring equipment, customer input, and monitoring center 400.

There are, of course, other response protocols which could be selectable or requested. Assume, for example, that for the system illustrated in FIGS. 5A and B the user determines that in the event of an actual threshold violation, the response should be to automatically shut down the electrical circuit and dispatch a technician. The automatic shutdown may occur according to the aforementioned steps and when the shutdown communication from control unit 44 is received at monitoring center 400, personnel may issue a dispatch command to the appropriate persons; as envisioned, dispatched personnel are affiliated with Company X, though this is by way of example and not by way of limitation.

When the dispatched person arrives onsite, it is desirable for there to already be equipment in place which will allow him/her to diagnose the threshold violation (e.g., to save time, to not further expose him/her to electrical shock hazards). Further, troubleshooting a fault condition in an electrical circuit while the circuit is de-energized is difficult (e.g., there is no visual indication of the fault, meters typical to the industry are ineffective, etc.). As such, one solution is to provide a bypass system (e.g., in service module 600) that is installed when the leakage current measuring equipment is installed (i.e., when the system is operating normally and not posing shock hazards) and allows qualified persons to isolate and energize each monitored electrical circuit independently. As can be seen in FIG. 9, optional service mode module 600 comprises a key switch 601 and LED indicator 602 to indicate when the module has been activated via switch 601; this ensures that only qualified persons may operate the bypass system (so to prevent accidentally energizing a system which may pose shock hazards to persons in proximity). Service mode module 600 further includes a pushbutton 604 or analogous manual control device which, when activated, forces contactors closed for the labeled circuit; FIG. 9 illustrates Circuits A-D in accordance with the system illustrated in FIGS. 5A and B. An LED indicator 603 clearly identifies which circuit is energized. In this manner, power can be supplied to each monitored circuit individually so that persons may test portions of the circuit, evaluate insulation, and otherwise troubleshoot the threshold violation. As envisioned, service mode module 600 is operated from a separate power supply (so to prevent damage to module 600 in the event that the threshold violation arose from transients in the line voltage) and is in communication with control unit 44 (so that nationwide monitoring center 400 is aware that the system in question is being operated in bypass mode), though this is by way of example and not by way of limitation.

C. Exemplary Method and Apparatus Embodiment 2

A second exemplary system is shown in FIG. 10 and illustrates the scenario in which a customer wants to monitor leakage current in (i) lighting circuits (in this example, street lights) and (ii) other electrical circuits (loads could include, for example, traffic lights, radar devices, crosswalk signals, motion sensors, timers, etc.). In the present embodiment it is possible for all electrical circuits, leakage current measuring equipment, and the monitoring service to be provided by Company X, however, for illustrative purposes it is assumed that the electrical systems are preexisting and Company X is supplying only the measuring equipment and monitoring service.

According to method 100, the user first subscribes to the monitoring service (see step 101). Step 101 is primarily the same for the present embodiment as for Exemplary Method and Apparatus Embodiment 1; one difference is that subscription is not automatic or otherwise initiated by the purchase of an electrical system (as the systems are preexisting). A user could contact Company X to initiate method 100 or Company X could contact the user.

Likewise, step 102 of method 100 is similar to that described for Embodiment 1; one difference is that optional service module 600 is not included (e.g., the customer did not want to incur the cost). Similar to the system illustrated in FIGS. 5A and B, power from a service distribution device 801 passes through toroids 210 (one for each circuit being monitored, regardless of the kind of load) and is delivered to each load (e.g., street lights 802). Toroids 210 are in operative connection with current leakage measuring device 1000; it is of note that in FIG. 10 toroids 210 have been illustrated as separate from device 1000, though they are, in fact, part of module 200 which is part of device 1000. In the present embodiment, the leakage measurements from device 1000 are transmitted to control unit 44 via a local network 800 (e.g., mesh network, powerline carrier, etc.). Local network 800 allows for a common control unit to communicate with the multiple loads that may be distributed over a wide area or multiple locations.

Steps 103 and 104 of method 100 may be more time-consuming in the present embodiment than in Embodiment 1 since Company X is not the provider of the electrical systems being monitored and, therefore, may not have an existing knowledge base to quickly determine appropriate thresholds, responses, etc. It will likely require research, multiple baseline measurements and/or other field testing, and communication with the customer to ensure the electrical systems are adequately characterized and the monitoring service is tailored to suit the customer's needs. However, one benefit to Company X providing the leakage current measurement equipment and monitoring service, and not providing the electrical systems, is that Company X can be assured that any equipment needed to satisfy special conditions (e.g., customer requests) does not impact the purchase of the electrical systems. For example, assume that in field 709 of webpage 700 the user requests that a visual indicator flash when there is an actual threshold violation. In the present embodiment, an LED and appropriate circuitry can be provided with the measuring equipment when shipped to the site and installed using existing enclosures. However, in Embodiment 1 the lighting system has not yet been installed (or may not have been purchased) and so adding one or more visual indicators may require a change in the quote price, changes to engineering drawings, etc., which may impact lead time or a customer's interest in purchasing the system.

In the present embodiment, steps 105 and 106 are similar to those described for Exemplary Method and Apparatus Embodiment 1. Common control unit 44 communicates the leakage current data from each monitored circuit (regardless of how wide-spread the circuits are geographically or what kinds of loads are included in each circuit) to monitoring center 400 for processing and monitoring in a manner similar to Embodiment 1. In this manner, an existing electrical system may be retrofitted so to provide leakage current monitoring and a response function (if customer-selected) akin to an intelligent GFCI.

However, in some situations retrofitting the electrical system or plurality of electrical systems will not allow for automatic shutdown as a selectable response protocol (e.g., control unit 44 cannot be interfaced with or send communications to the existing power distribution equipment). In this situation, a user could select a response protocol that indicates monitoring center 400 should contact the user and walk the user through a manual shutdown process. As has been stated, understanding how to manually shut the circuit (or system) down is one of the many aspects to characterizing the electrical circuit and load (see reference no. 103).

D. Improved Design and Operation of Electrical Systems

Over a period of time, the knowledge base built at monitoring center 400 may be useful in developing ways to improve the design and installation of an electrical system (e.g., reduce hazardous conditions, avoid conditions that may indicate an area of concern); there are likely patterns of conditions that could be avoided with proper system design. Data from the knowledge base may also be useful in designing better GFCI devices and systems that provide for intelligent threshold values with similar benefits as absolute-type devices. The combination of an improved electrical system with fewer cause-and-effect relationships and an improved GFCI device may result in a more and even highly reliable system. Other potential benefits may be in reduced maintenance of the electrical system by reducing faults that trigger an interruption response, threshold violations that require maintenance of the system, or otherwise.

E. Options and Alternatives

The invention may take many forms and embodiments. The foregoing examples are but a few of those. To give some sense of some options and alternatives, a few examples are given below.

A wide variety of means and methods to characterize an electrical circuit and load (see reference no. 103), establish threshold levels (see reference nos. 101 and 104), establish response protocols (see reference nos. 101 and 104), as well as many types and examples thereof, have been discussed. It is of note that any number of these may be used and/or combined with other means, methods, types, or examples not disclosed herein and not depart from at least some aspects of the present invention. For example, discussed herein is a user-selected response protocol in which power to the affected electrical circuit is terminated. However, for some situations immediate termination of power may pose a safety hazard (e.g., turning the lights off at a sports field mid-play may result in player injury). So, for example, assume a user wants leakage current monitoring for the lighting system for a sports field (e.g., sports field 70, FIG. 5A) and the lighting system for the adjacent parking lot. According to aspects of the invention, the user could designate an automatic shutdown response protocol in the event of a threshold violation for the parking lot lighting system. For the sports lighting system, the user could request a response protocol not discussed herein but using the same methods and monitoring equipment discussed herein and not depart from at least some aspects of the present invention. For example, a lock-out protocol could be requested wherein power to the affected circuit is not terminated, but wherein control unit 44 prevents the circuit from being energized again until corrective measures are taken; in the aforementioned example, the sports lighting system may experience an actual threshold violation on one of the monitored circuits and rather than terminate power to the lights during use, control unit 44 simply prevents providing power to the affected light the next time the system is turned on. Monitoring center 400 would be made aware of the lock-out condition according to method 100 disclosed herein and corrective actions (e.g., dispatching personnel to diagnose and remedy the condition) could be taken; this approach has the added benefit of providing a local notification of a possibly unsafe condition without adding extra equipment.

With regards to leakage current, an alternative approach to measuring imbalances may focus on separating the leakage current that is capacitively coupled from the fault current which is in phase with the voltage. For the specific example of lighting systems, leakage current may be due to differences in ballast manufacturing, capacitive coupling occurring in the long power lines running to the load, imperfect insulation between conductors in the electrical system, or due to the different operating phases encountered during normal operation of a lamp. In this alternative approach to measuring current imbalance, the 90° phase-shifted capacitively coupled leakage current may be factored out and only in-phase fault current compared to the threshold level(s).

Aspects according to the present invention could be used within a larger system that promotes effective management of an electrical system to provide for preventive measures, system reliability, energy savings, and reduced maintenance, for example. The system to provide effective management of electrical system may include monitoring of other areas or characteristics of the electrical system such as power consumption, voltage, operating hours, ground integrity, or otherwise to provide a more comprehensive view of the system parameters and operating status.

As disclosed herein, the monitoring service is facilitated by a large scale, remotely located monitoring center (see reference no. 400) with the ability to monitor a large number of unrelated sites. Though referred to herein as a nationwide monitoring center, aspects according to the present invention are not limited to such. For example, monitoring center 400 could provide leakage current monitoring world-wide, or only within one town. Likewise, the center could monitor thousands of sites, or only one. The apparatus, methods, and systems described herein are scalable to suit a variety of needs, locations, and types of electrical systems.

With regards to the role of personnel at monitoring center 400, it has been stated that user-selected or user-requested response protocols, as well as threshold levels, could be adjusted over time. This could be initiated by the user (e.g., by calling monitoring center 400) or by monitoring center 400 (e.g., as part of a routine customer service survey). If such changes occur, personnel could update the information at monitoring center 400 and communicate program changes to the leakage current monitoring equipment via control unit 44 in the same manner as other communications described herein. If the changes require further interaction with the user or other persons (e.g., a user could request a response protocol include calling maintenance personnel and walking them through a preliminary troubleshooting process), personnel at monitoring center 400 could facilitate and/or coordinate such efforts.

What is claimed is:

1. A method of monitoring leakage current in user electrical circuits or systems based on subscription to a monitoring service wherein the monitoring service monitors one or more conditions not including leakage current at or near the user electrical circuits or systems comprising:
   a. subscribing by a user to the monitoring service;
   b. installing a device for measuring leakage current in a circuit or system of the subscribed user;
   c. defining one or more leakage current threshold levels for one or more conditions indicative of an electrical fault or an electrical fault concern relative to the circuit or system wherein the defining is based, at least in part, on:
      i. operating conditions of a load in the circuit or system;
      ii. user preferences; and
      iii. one or more initial leakage current measurements;
   d. selecting by the user a desired response from the monitoring service for each defined threshold level;
   e. communicating measured leakage current to the monitoring service;
   f. comparing measured leakage current to (i) the one or more defined thresholds and (ii) the one or more monitored conditions at or near the circuit or system;
   g. if the comparison is unfavorable, effectuating the desired response to an approached threshold, reached threshold, or exceeded threshold by the monitoring service; and
   h. reviewing by the monitoring service the one or more threshold levels of step c and the one or more desired responses of step d with the user periodically.

2. The method of claim 1 wherein the monitoring service comprises a centralized nationwide service (i) which communicates with a plurality of subscribers and (ii) to which a plurality of leakage current measurements from a plurality of user electrical circuits or systems are communicated via a wide area communications network, and wherein the defining one or more leakage current threshold levels is further based, at least in part, on communicated data or information from one or more other subscribers or user electrical circuits or systems.

3. The method of claim 2 wherein the network is of state, regional, national, or world-wide scope.

4. The method of claim 1 wherein the one or more conditions at or near the user electrical circuits or systems monitored by the monitoring service comprises ambient conditions.

5. The method of claim 1 wherein the leakage current measuring device comprises a toroid-type device and associated circuitry.

6. The method of claim 1 wherein the desired response from the monitoring service comprises one or more of:
   a. an alert communicated to the user or a representative of the user;
   b. an instruction to the circuit or system to interrupt power to at least a portion of the circuit or system;
   c. an instruction to activate a visual indicator at or near the circuit or system; and
   d. dispatching personnel to the circuit or system to determine why the threshold was approached, reached, or exceeded.

7. A method of monitoring and detecting a fault condition in an electrical system comprising:
   a. continuously measuring leakage current in the electrical system during operation of the electrical system;
   b. establishing a threshold level for leakage current that defines a fault condition for the electrical system wherein the threshold level is determined based on operating characteristics of a load of the electrical system and initial leakage current measurements used as a baseline;
   c. identifying one or more conditions external to the electrical system which may increase leakage current but do not indicate a faint condition in the electrical system;
   d. collecting leakage current measurements;
   e. establishing a trend for leakage current based on collected measurements data;
   f. determining if there exists a potential fault condition for the electrical system or a load of the electrical system based on (i) proximity of the measurements to the threshold level, (ii) the trend, and (iii) the presence of said one or more conditions; and
   g. taking one or more actions if it is determined a potential fault condition exists comprising:
      i. communicating an alert; or
      ii. facilitating interruption of power to the electrical system.

8. The method of claim 7 wherein the system includes a local control device and the step of facilitating interruption of power comprises instructing the local control device to interrupt power to at least a portion of the electrical system.

9. The method of claim 7 wherein the step of collecting of leakage current measurements and determining a potential fault condition occurs at a monitoring center remotely located from and in communication with the electrical system.

10. The method of claim 7 wherein the step of communicating an alert comprises conveying the alert to persons associated with the electrical system via:
  a. email;
  b. phone
  c. a website;
  d. a printed report; or
  e. visual indicator at or near the electrical system.

11. The method of claim 7 wherein the threshold level is user-definable and is re-defined or evaluated at one or more predetermined times.

12. A system for monitoring leakage current in an electrical circuit or system comprising:
  a. a measuring module comprising a device to measure a signal indicative of the leakage current in the electrical circuit or system; and
  b. a processor module in communication with the measuring module to:
    i. receive and process the signal, wherein the processing comprises:
      1. filtering out a portion of the signal based at least in part on operating characteristics of a load of the electrical system or circuit;
      2. converting the signal from analog to digital; and
      3. either (i) averaging the signal to over a predetermined time to produce to single value or (ii) determining the signal peak over a predetermined time, wherein the selection of (i) or (ii) is based, at least in part, on said operating conditions of the load;
    ii. compare the processed signal with a pre-determined threshold level; and
    iii. generate a response to a threshold violation.

13. The system of claim 12 wherein the processed signal is compared to the pre-determined threshold level continuously while the electrical circuit or system is energized.

14. The system of claim 12 wherein the processed signal is compared to the pre-determined threshold level at pre-determined times.

15. The system of claim 12 wherein the electrical circuit or system comprises a lighting system.

16. The system of claim 15 wherein the lighting system comprises high intensity, high power, wide area lights.

17. The system of claim 12 wherein the threshold level is determined by characterization of a load of the electrical circuit or system and the generated response is determined by a combination of characterization of the load of the electrical circuit or system and input from a user of the electrical circuit or system or a representative of the user of the electrical circuit or system.

\* \* \* \* \*

UNITED STATES PATENT AND TRADEMARK OFFICE
CERTIFICATE OF CORRECTION

| | |
|---|---|
| PATENT NO. | : 8,605,394 B2 |
| APPLICATION NO. | : 12/833544 |
| DATED | : December 10, 2013 |
| INVENTOR(S) | : Crookham et al. |

It is certified that error appears in the above-identified patent and that said Letters Patent is hereby corrected as shown below:

In the Claims:

Col. 18, Claim 7, Line 48:
DELETE after a "faint"
ADD after a --fault--

Signed and Sealed this
Twenty-fifth Day of February, 2014

Michelle K. Lee
*Deputy Director of the United States Patent and Trademark Office*